US006226866B1

(12) United States Patent
Wilson et al.

(10) Patent No.: US 6,226,866 B1
(45) Date of Patent: May 8, 2001

(54) METHOD OF MAKING CARBON-CARBON COMPOSITE VALVE FOR HIGH PERFORMANCE INTERNAL COMBUSTION ENGINES

(75) Inventors: Doug Wilson, Laguna Beach; Sam Lee, Gardena; Raj Mathur, Huntington Beach, all of CA (US)

(73) Assignee: Hitco Carbon Composites, Inc., Gardena, CA (US)

( * ) Notice: Subject to any disclaimer, the term of this patent is extended or adjusted under 35 U.S.C. 154(b) by 0 days.

(21) Appl. No.: 09/548,819

(22) Filed: Apr. 13, 2000

Related U.S. Application Data

(62) Division of application No. 09/209,677, filed on Dec. 11, 1998, now Pat. No. 6,085,714.

(51) Int. Cl.[7] ........................................................ B23P 15/00

(52) U.S. Cl. .................. 29/888.45; 29/888.4; 29/888.46; 29/890.129; 29/890.132; 123/188.3; 123/188.4

(58) Field of Search ........................... 29/888.4, 890.126, 29/890.128, 890.129, 890.132, 888.45, 888.46; 123/188.1, 188.2, 188.3, 188.4

(56) References Cited

U.S. PATENT DOCUMENTS

| 1,288,811 | 12/1918 | Birrell . |
| 1,470,034 | 10/1923 | Schupp . |
| 2,124,702 | 7/1938 | Jacoby . |
| 2,396,552 | 3/1946 | Cape . |
| 4,359,022 | 11/1982 | Nakamura et al. . |
| 4,554,898 | 11/1985 | Yamada et al. . |
| 4,597,367 | 7/1986 | Hayashi . |

(List continued on next page.)

FOREIGN PATENT DOCUMENTS

| 60-125711 | 7/1985 | (JP) . |
| 64-35005 | 2/1989 | (JP) . |
| 6-200768 | 7/1994 | (JP) . |
| WO 97/34077 | 9/1997 | (WO) . |

Primary Examiner—I Cuda Rosenbaum
(74) Attorney, Agent, or Firm—Renner, Kenner, Greive, Bobak, Taylor & Weber

(57) ABSTRACT

The present invention provides a carbon-carbon (C/C) composite valve structure useful for high temperature internal combustion engines comprising (a) a carbon-carbon (C/C) composite valve stem having a flared end and a non-flared end opposite the flared end; and (b) a carbon-carbon (C/C) composite valve head applied onto the flared end of the valve stem, wherein at least one of the carbon-carbon (C/C) composite valve stem and head is coated with a high temperature resistant coating. A method is further provided to fabricate the carbon-carbon (C/C) composite valve comprising machining a carbon-carbon (C/C) composite valve stem having a flared end and a non-flared end from a cured and densified carbon-carbon (C/C) plate having a sufficient thickness; applying a plurality of circular fabric plies, made from a balanced carbon-carbon (C/C) prepreg and having a slit in the center of said ply, coaxially onto the non-flared end of said carbon-carbon ((C/C)) valve stem and advancing said plurality of plies to intimately contact the flared end of said carbon-carbon (C/C) valve stem; placing said carbon-carbon (C/C) valve stem contacted with said plurality of circular fabric plies into a die; closing said die and cure pressing said circular fabric plies onto the flared end of said carbon-carbon (C/C) valve stem to form a valve head; carbonizing said press cured carbon-carbon (C/C) composite valve; densifing said carbon-carbon (C/C) composite valve structure; and coating at least one of said carbon-carbon (C/C) composite valve stem and valve head with a high temperature resistant coating comprising an inner layer and an outer layer.

11 Claims, 3 Drawing Sheets

U.S. PATENT DOCUMENTS

| | | |
|---|---|---|
| 4,683,809 | 8/1987 | Taylor . |
| 4,736,676 | 4/1988 | Taylor . |
| 4,881,500 | 11/1989 | Kojima et al. . |
| 4,909,133 | 3/1990 | Taylor et al. . |
| 4,928,645 | 5/1990 | Berneburg . |
| 5,094,200 | 3/1992 | Fontichiaro . |
| 5,190,002 | 3/1993 | Wietig . |
| 5,237,967 | 8/1993 | Willermet et al. . |
| 5,257,453 | 11/1993 | Neumann et al. . |
| 5,769,046 | 6/1998 | Ransone . |
| 5,771,873 | 6/1998 | Potter et al. . |
| 5,792,402 | 8/1998 | Rivers et al. . |
| 5,908,016 | 6/1999 | Northam et al. . |
| 5,934,648 | 8/1999 | Rivers et al. . |

2

METHOD OF MAKING CARBON-CARBON COMPOSITE VALVE FOR HIGH PERFORMANCE INTERNAL COMBUSTION ENGINES

CROSS REFERENCE TO RELATED APPLICATIONS

This application is a divisional application of U.S. Ser. No. 09/209,677, filed Dec. 11, 1998, now U.S. Pat. No. 6,085,714.

TECHNICAL FIELD OF INVENTION

The present invention is directed to carbon-carbon (C/C) composite structures. The present invention is more particularly directed to carbon-carbon (C/C) composite valve structures for use in high performance internal combustion engines.

BACKGROUND OF INVENTION

There is an ongoing effort to develop internal combustion engine parts, such as valves, pistons and connecting rods, that are light-weight and that enhance engine performance at high temperatures. One such effort is in the reduction of the weight of engine parts that are constrained in reciprocating movements within an internal combustion engine.

Inlet and exhaust valves for internal combustion engines are currently made from steel and other metals. Valves made from metals are heavy and exhibit poor structural properties at high temperatures. Due to their weight, metallic valves acquire enormous inertial loads as engine speed increases. The enormous inertial loads adversely effects the amount of power the engine can produce, by limiting the engine's capability to reach higher revolutions per minute (RPM). In addition, high levels of friction are created by the traditional metallic valves. The heavy weight of metallic valves, high levels of friction associated with metal valves and the temperature limitations of metallic valves result in an overall decrease in the efficiency of internal combustion engines at high temperatures.

In response to the problems inherent to the use of metallic valves, those skilled in the art have sought to replace the traditional metallic valves with valves made from light-weight materials, that can operate reliably and increase internal combustion engine performance at extremely high temperatures.

One such replacement for metallic valves are valves made from titanium or titanium aluminide. Although valves made from these materials are light-weight and can operate reliably at high temperatures, the costs of such materials has limited their use in the industry.

Another non-metallic material proposed as a replacement for metallic valves are ceramic materials. Although valves made from ceramic materials are lighter than metallic valves and can operate at high temperatures, they have 30 to 50% the density of the traditional metallic valves, have proven to be brittle and are subject to catastrophic failure at such extreme temperatures.

To improve the brittle nature of ceramic valves, Berneburg et al., U.S. Pat. No. 4,928,645, disclosed a ceramic valve with a reinforcing woven carbon fiber sleeve. The ceramic valve disclosed by Berneburg et al. includes (a) an elongated valve stem comprising fibrous ceramic sleeving which is packed with an axially aligned unidirectional cluster of ceramic reinforcing fibers; and (b) a ceramic head containing fibers which is molded onto the valve stem. The use of discontinuous ceramic fibers from the valve stem to head results in an inherently weak valve structure. The discontinuous fibers offer low stiffness and their distribution can vary from valve to valve in production, with low resin pockets yielding voids during carbonization of the phenolic precursor.

Another possible replacement for metallic valves is disclosed by NASA, PCT/97/03965, which teaches a carbon fiber reinforced carbon composite valve for internal combustion engine comprising a valve stem and head. The valve includes braided carbon fiber material over axially aligned unidirectional carbon fibers, forming a valve stem. The braided and unidirectional carbon fiber are "broomed" out at one end of the valve stem to form the valve head. The valve structure is subsequently densified with a matrix of discontinuous carbon fibers. This type of valve construction results in poor structural strength for the simple reason that as the fibers transition from the valve stem, nominally 6 mm in diameter, to the valve head, nominally 40 mm in diameter, the fibers have to transition from a smaller volume to a larger one. As a result, the fiber volume in the valve head is decreased by a factor of 44. The biaxial strength is decreased dramatically and is essentially that of the matrix in these regions. Such a dramatic decrease in the fiber volume results in a negligible reinforcement of the valve seat.

Therefore, it is desirable to develop a light-weight composite valve structure for internal combustion engines that is capable of reliable operation at extremely high temperatures, and that allows the engine to obtain higher revolutions per minute (RPM), thus improving the overall efficiency of the engine. It is further desirable to develop a light-weight composite valve structure for internal combustion engines that are more reliable at high temperatures than the carbon fiber reinforced ceramic valves disclosed in the prior art.

SUMMARY OF INVENTION

It is therefore an object of the present invention to provide a light-weight carbon-carbon (C/C) composite valve structure for internal combustion engines.

It is a further object of the present invention to provide a light-weight carbon-carbon (C/C) composite valve structure for internal combustion engines that is capable of reliable operation at high temperatures.

It is a further object of the present invention to provide a light-weight carbon-carbon (C/C) composite valve structure for internal combustion engines that has strong structural properties at high temperatures.

It is a further object of the present invention to provide a light-weight carbon-carbon (C/C) composite valve structure for internal combustion engines that has a reduced surface porosity of the valve.

It is a further object of the present invention to provide a light-weight carbon-carbon (C/C) composite valve structure for internal combustion engines that is adapted to counteract the abrasive properties of carbon-carbon (C/C).

It is a further object of the present invention to provide a light-weight carbon-carbon (C/C) composite valve structure for internal combustion engines that prevents the movement of the axial or stem fibers.

It is a further object of the present invention to provide a light-weight carbon-carbon (C/C) composite valve structure for internal combustion engines in which the strength does not change from the valve stem end to the flared valve head end.

It is a further object of the present invention to provide a light-weight carbon-carbon (C/C) composite valve structure for internal combustion engines that is oxidation resistant.

It is a further object of the present invention to provide a light-weight carbon-carbon (C/C) composite valve structure for internal combustion engines that has a low surface friction.

It is a further object of the present invention to provide a light-weight carbon-carbon (C/C) composite valve structure for internal combustion engines that operate at high rotations per minute (RPM), being capable of greater than 10,000 RPM.

The present invention, therefore, provides a carbon-carbon (C/C) composite valve for high temperature internal combustion engines comprising an elongated cylindrical carbon-carbon (C/C) composite valve stem having a flared end and a non-flared end opposite the flared end, a valve head comprising a plurality of cure pressed, substantially circular carbon-carbon (C/C) fabric plies; wherein said plies are in intimate reinforcing contact with the flared end of the elongated cylindrical carbon-carbon (C/C) composite valve stem and wherein at least one of the carbon-carbon (C/C) composite valve stem and valve head is coated with a high temperature resistant coating having a inner layer and outer layer.

The carbon-carbon (C/C) composite valve of the present invention is fabricated such that the fiber volume does not change from the valve stem end to the flared valve head end, thus increasing the strength of said carbon-carbon (C/C) valve. The carbon-carbon (C/C) composite valve of the present invention has a high temperature resistant coating to seal the surface porosity of the valve, and a machined surface of 0.3 Ra microns, adapted to counteract the abrasive properties of carbon-carbon (C/C).

The present invention further provides a method for fabricating a carbon-carbon (C/C) composite valve for high temperature internal combustion engines comprising machining a carbon-carbon (C/C) valve stem having a flared end and a non-flared end opposite said flared end, from a cured and densified carbon-carbon (C/C) plate having a sufficient thickness; applying a plurality of circular fabric plies, made from a balanced carbon-carbon (C/C) prepreg and having a slit in the center of said ply, coaxially onto the non-flared end of said carbon-carbon (C/C) valve stem and advancing said plurality of circular plies to intimately contact the flared end of said carbon-carbon (C/C) valve stem; placing said carbon-carbon (C/C) valve stem contacted with said plurality of circular fabric plies into a die; closing said die and cure pressing said circular fabric plies onto the flared end of said carbon-carbon (C/C) valve stem in the form of a valve head; carbonizing said press cured carbon-carbon (C/C) composite valve structure; densifying said carbon-carbon (C/C) composite valve structure; and coating at least one the carbon-carbon (C/C) composite valve stem and valve head with a high temperature resistant coating, comprising an inner layer and an outer layer.

The present invention provides a further method for fabricating a carbon-carbon (C/C) composite valve for high temperature internal combustion engines by a known brazing technique using standard brazing powders or high temperature brazing powders based on titanium, molybdenum, copper and the like. A carbon-carbon (C/C) composite valve stem having a flared end and a non-flared end opposite said flared end is first machined from a cured and densified carbon-carbon (C/C) plate having a sufficient thickness. The valve head is similarly machined from a previously cured, carbonized and densified carbon-carbon (C/C) plate of sufficient thickness to match the dimensions of the valve head. A tapered hole is machined in the center of the carbon-carbon (C/C) composite valve head having a diameter sufficient to allow the valve head to be coaxially slipped onto the non-flared of the carbon-carbon (C/C) valve stem. The carbon-carbon (C/C) valve head is advanced to intimately contact the flared end of said carbon-carbon (C/C) valve stem, and the braze material is applied to the interface of said carbon-carbon (C/C) valve stem and said carbon-carbon (C/C) valve head. The braze material is preferably in form of a shim-stock, paint solution, pad, foil or paste. The carbon-carbon (C/C) valve stem and valve head are heat-treated at high temperatures in a vacuum, to bond the valve head and valve stem by the formation of a diffusion bond between the carbon-carbon (C/C) composite material and the braze material.

DETAILED DESCRIPTION OF THE INVENTION

Figure 2:
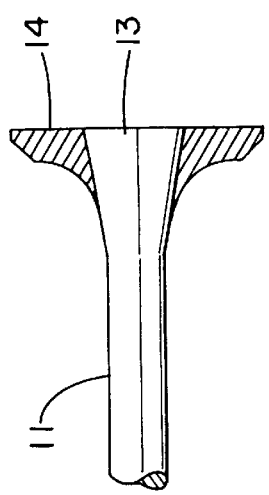
FIG. 2 is a sectional view of the valve stem to head transition of the carbon-carbon (C/C) valve of the present invention.
Figure 5B:
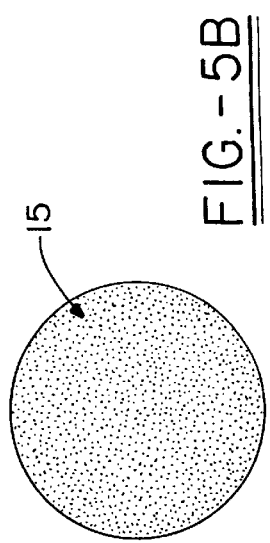
FIG. 5B is a schematic elevational representation of the finished carbon-carbon (C/C) inlet valve of the present invention showing both a valve head coating.
Figure 1:
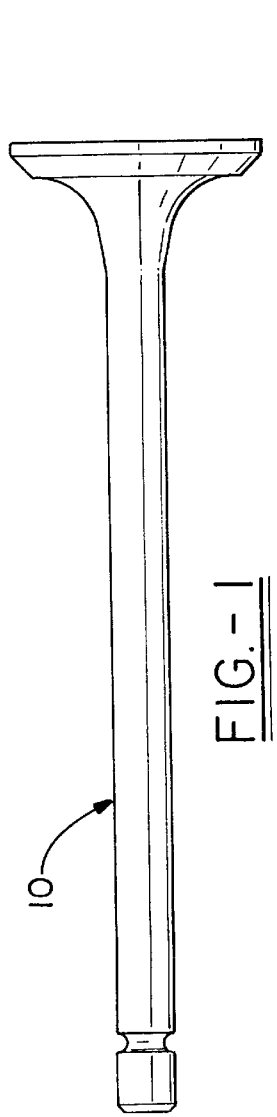
FIG. 1 is an elevational view of the carbon-carbon (C/C) valve of the present invention without a coating.
Figure 3:
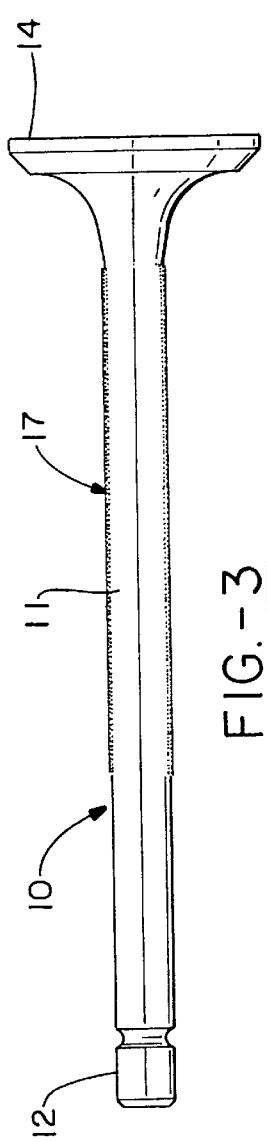
FIG. 3 is a schematic representation of the carbon-carbon (C/C) valve of the present invention with the valve stem coating in its "as deposited" form in sectional view.
Figure 4:
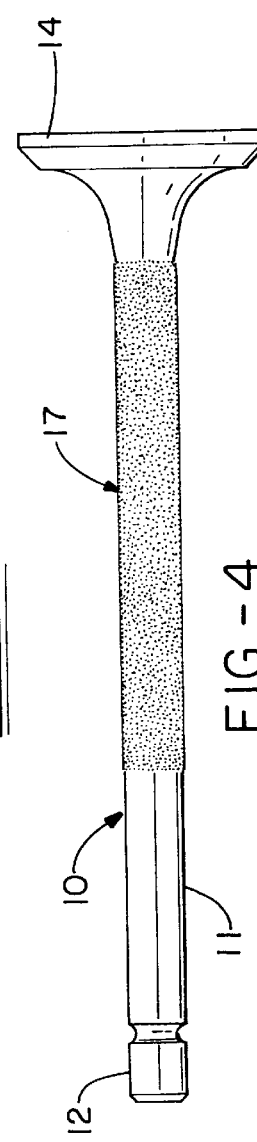
FIG. 4 is a schematic elevational representation of the finished carbon-carbon (C/C) inlet valve of the present invention showing valve stem coating.
Figure 5A:
FIG. 5A is a schematic elevational representation of the finished carbon-carbon (C/C) inlet valve of the present invention showing a valve stem coating.

A light-weight carbon-carbon (C/C) composite valve for high performance internal combustion engines, and a method of producing said valves has been developed, parts fabricated and tested successfully for internal combustion engines that operate that at greater than 10,000 RPM, such as Formula 1 engines. These internal combustion engines pose the most extreme conditions of structural and thermal loads, and equally tight machining tolerances.

Depending on the type of carbon-carbon (C/C) composite construction of the valve material, for example, discontinuous fiber composites, or the lack of an external coating on the composite structure can limit the use of carbon-carbon (C/C) valves to modest engine conditions of rpm and operating temperature. The light-weight carbon-carbon (C/C) composite valve of the present invention was developed in response to the continued failure of non-metallic valves, comprising such materials as discontinuous ceramic fibers, to perform reliably at extremely high temperatures in internal combustion engines.

Carbon fiber reinforced carbon matrix materials, or carbon/carbon (C/C) composites, have thermal stability, high resistance to thermal shock due to high thermal conductivity and low thermal expansion behavior (that is, thermal expansion coefficient or TEC), and have high toughness, strength and stiffness in high-temperature applications. Carbon/carbon composites comprise carbon reinforcements mixed or contacted with matrix precursors to form a "green" composite (a pre-preg), which is then carbonized to form the carbon/carbon composite. They may also comprise carbon reinforcements (a dry pre-form) in which the matrix is introduced fully or in part by chemical vapor infiltration.

The carbon reinforcements are commercially available from Amoco, DuPont, Hercules, and others, and can take the form of continuous fiber, chopped fiber, cloth or fabric, chopped cloth or fabric (referred to as moulding compounds), yarn, chopped yarn, and tape (unidirectional arrays of fibers). Yarns may be woven in desired shapes by braiding, knitting, or by multidirectional weaving. The yarn, cloth and/or tape may be wrapped or wound around a mandrel to form a variety of shapes and reinforcement orientations. The fibers may be wrapped in the dry state or they may be impregnated with the desired matrix precursor prior to wrapping, winding, or stacking. Such prepreg and woven structures reinforcements are commercially available from various sources, including Fiberite, Hexcel, and Cytek. The reinforcements are prepared from precursors such as polyacrylonitrile (PAN), rayon or pitch.

Matrix precursors which may be used to form carbon/ carbon composites according to the present invention via the pre-preg route include liquid sources of high purity carbon, such as phenolic resins and pitch, and gaseous sources, including hydrocarbons such as methane, ethane, propane and the like. Representative phenolics include, but are not limited to, phenolics sold under the trade designations USP 39 and 91LD, such as supplied by Ashland Chemical, and SC1008 such as supplied by Borden Chemical.

The carbon/carbon (C/C) composites useful in the present invention may be fabricated by a variety of techniques. Conventionally, resin impregnated carbon fibers are autoclave-, or press-molded into the desired shape on a tool or in a die. For example, lay-ups of two dimensional (2D) continuous fiber or woven fabrics may be formed on a lay-up tool in the desired shape. The molded parts are heat-treated in an inert environment to temperatures from about 700° to about 900° C. in order to convert the organic phases to carbon. The carbonized parts are then densified by carbon chemical vapor infiltration (CVI) or by multiple cycle reimpregnations and carbonizations with the resins described above. Other fabrication methods include hot-pressing and the chemical vapor impregnation of dry preforms. Methods of fabrication of carbon/carbon composites which may be used according to the present invention are described in U.S. Pat. Nos. 3,174,895 and 3,462,289, which are incorporated by reference herein.

Figure 6:
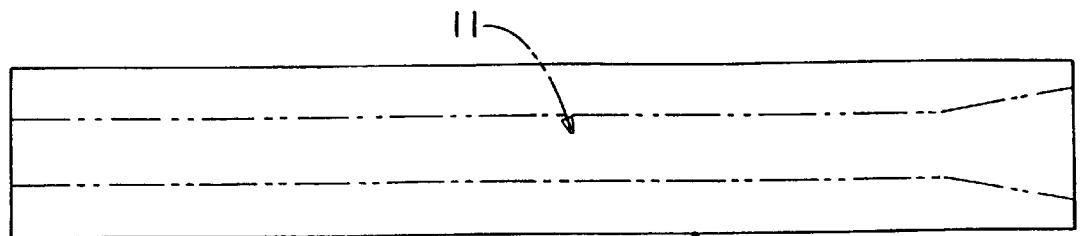
FIG. 6 is a schematic representation of a sufficiently thick, previously cured and densified carbon-carbon (C/C) plate from which the carbon-carbon (C/C) composite valve stem of the present invention is machined.
Figure 7:
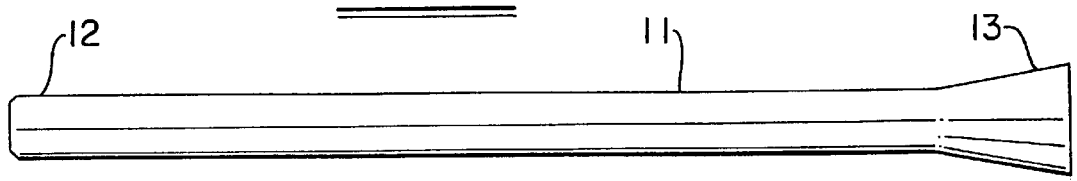
FIG. 7 is a schematic representation of the machined carbon-carbon (C/C) composite valve stem of the present invention.

The carbon-carbon ((C/C)) composite valve of the present invention is a two piece construction comprising a valve stem and a valve head. The valve stem is machined from a previously cured and densified carbon-carbon (C/C) plate of sufficient thickness to yield the stem shown in FIGS. 6 and 7, respectively. The lay up of the carbon-carbon (C/C) plate consists of plies of balanced woven fabrics, or a woven uni-fabric, that is unbalanced in fiber volume with a higher fiber volume in the stem axis direction. Unlike the carbon fiber reinforced valve constructions disclosed by of Berneburg et al. (U.S. Pat. No. 4,928,645) or NASA PCT/U.S. 97/03965, the woven fabrics of the present invention keep the fiber aligned and prevent movement of the axial or stem fibers. Therefore, a surrounding sleeve or braid is not required, as in the previous art.

The carbon-carbon (C/C) composite valve construction of the present invention is an improvement over the prior art for two principle reasons: 1) upon machining of the prior art valve structure, the braided sleeves lead to cut fibers held together loosely in the now open braid. In this situation, not only does the braid loose its strength, but it also leads to large surface heterogeneities, which no amount of machining, or surface coating can reduce to surface finish of the requisite 0.4 Ra micrometers or better; 2) the interface between the braid and inner core of uni-fibers described in the carbon-carbon (C/C) valve constructions disclosed in the prior art is separated by long pores prior to densification. During densification, the pores can never be filled to a satisfactory void level if a chemical vapor densification (CVD) technique is being used, as in the present invention. Resin transfer techniques have to be used, which often cause uneven bundling and also bending of the inner core of uni-fibers. Resin impregnation techniques also yield glassy or amorphous carbon matrices, and the resulting fiber-matrix interface is inferior.

In the present invention, such a processing scheme is avoided in order to develop a strong fiber-matrix interface that can transfer loads evenly across the stem cross section. In contrast, CVD matrices can be graphitized to increase its stiffness or modulus. The carbon-carbon (C/C) valve stem of the present invention is machined out of a carbon-carbon (C/C) plate whose fiber volume and packing in the matrix is uniform, and high at about 50%, resulting in a much stronger valve stem.

The valve construction disclosed by NASA (PCT/U.S. 97/03965) comprises an inner core of a near net shape valve that was molded from chopped fibers, sleeved in a braid and then the outer braid splayed to cover the inner core. This type of construction proved to be of poor structural strength for the simple reason that as the fibers transition from the valve stem, nominally 6 mm in diameter, to the valve head, nominally 40 mm in diameter, the fibers have to transition from a smaller volume to a larger one. As a result, the fiber volume in the valve head drops by a factor of 44. Such a dramatic decrease in fiber volume leads to negligible fiber reinforcement of the valve seat. The biaxial strength drops dramatically and is essentially that of the matrix in these regions.

In U.S. Pat. No. 4,928,645, discontinuous or chopped fibers are used to form the valve head. However, the discontinuous fibers offer low stiffness and their distribution can vary from valve to valve during production, with resin rich pockets yielding large voids during carbonization of the phenolic precursor. It is assumed that the outer braid or sleeve can be splayed into the valve head shape and the individual fibers rolled back to the center of the valve head face. In this situation, there is a frequent occurrence of breakage of fibers, unraveling a braid and splaying fibers, aside from the lowering of fiber density of the carbon fiber reinforced valve.

The present invention, therefore, provides a carbon-carbon (C/C) composite valve for high temperature internal combustion engines comprising an elongated cylindrical carbon-carbon (C/C) composite valve stem having one flared end and non-flared end opposite the flared end, a valve head comprising a plurality of substantially circular carbon-carbon (C/C) fabric plies; wherein said plies are in intimate reinforcing contact with the flared end of the elongated cylindrical carbon-carbon (C/C) composite valve stem and wherein at least one of the carbon-carbon (C/C) composite valve stem and valve head is coated with a high temperature resistant coating having a inner layer and outer layer.

Figure 8:
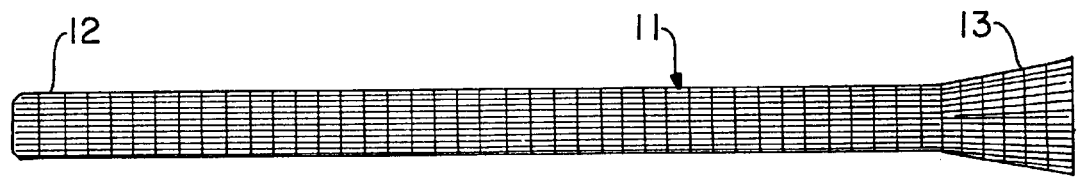
FIG. 8 is a schematic representation of the machined carbon-carbon (C/C) composite valve stem of the present invention showing the integral continuous woven fabric.

In the preferred embodiment, the carbon-carbon (C/C) composite valve 10 of the present invention is a two piece construction consisting of a valve stem 11 and a valve head 14. The valve stem 11 is machined from a previously cured and densified carbon-carbon (C/C) plate 20 of sufficient thickness to yield the stem. Two-dimensional (2D) carbon-carbon (C/C) plates having a thickness equal to, or greater than the largest diameter of the valve stem, which occurs at the flared end of the valve stem, are cut into rectangular lengths. Preferably, a computer assisted manufacturing technique maximizes utilization by nesting the stem cut-outs. These rectangular lengths of carbon-carbon (C/C) are turned on a lathe into elongated cylindrical rods or stems. As shown in FIG. 8, the resulting elongated cylindrical carbon-carbon (C/C) valve stem 11 has a non-flared end 12, having a substantially uniform diameter, and a flared end 13 opposite said non-flared end 12, being flared out by about 7 to about 20 degrees. This construction provides unidirectional, axially aligned carbon fibers in which the density does not substantially change from the non-flared stem end 12 to flared end 13. The ply or fiber orientation is maintained parallel to the stem axis. The carbon-carbon (C/C) composite valve of the present invention is fabricated such that the fiber density does not change from the valve stem end to the flared valve head end, thus increasing the strength of said carbon-carbon (C/C) valve.

Figure 9:
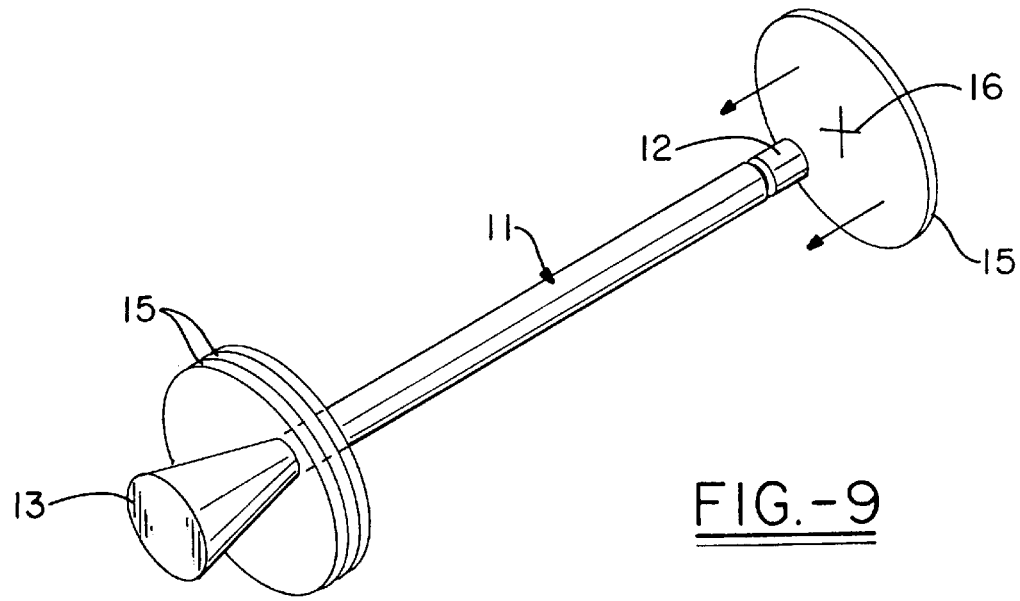
FIG. 9 is a schematic representation of the process of coaxially applying the valve head plies onto the non-flared end of the carbon-carbon (C/C) composite valve stem, and advancing the valve head plies to contact the flared end of the carbon-carbon (C/C) composite valve stem.
Figure 10:
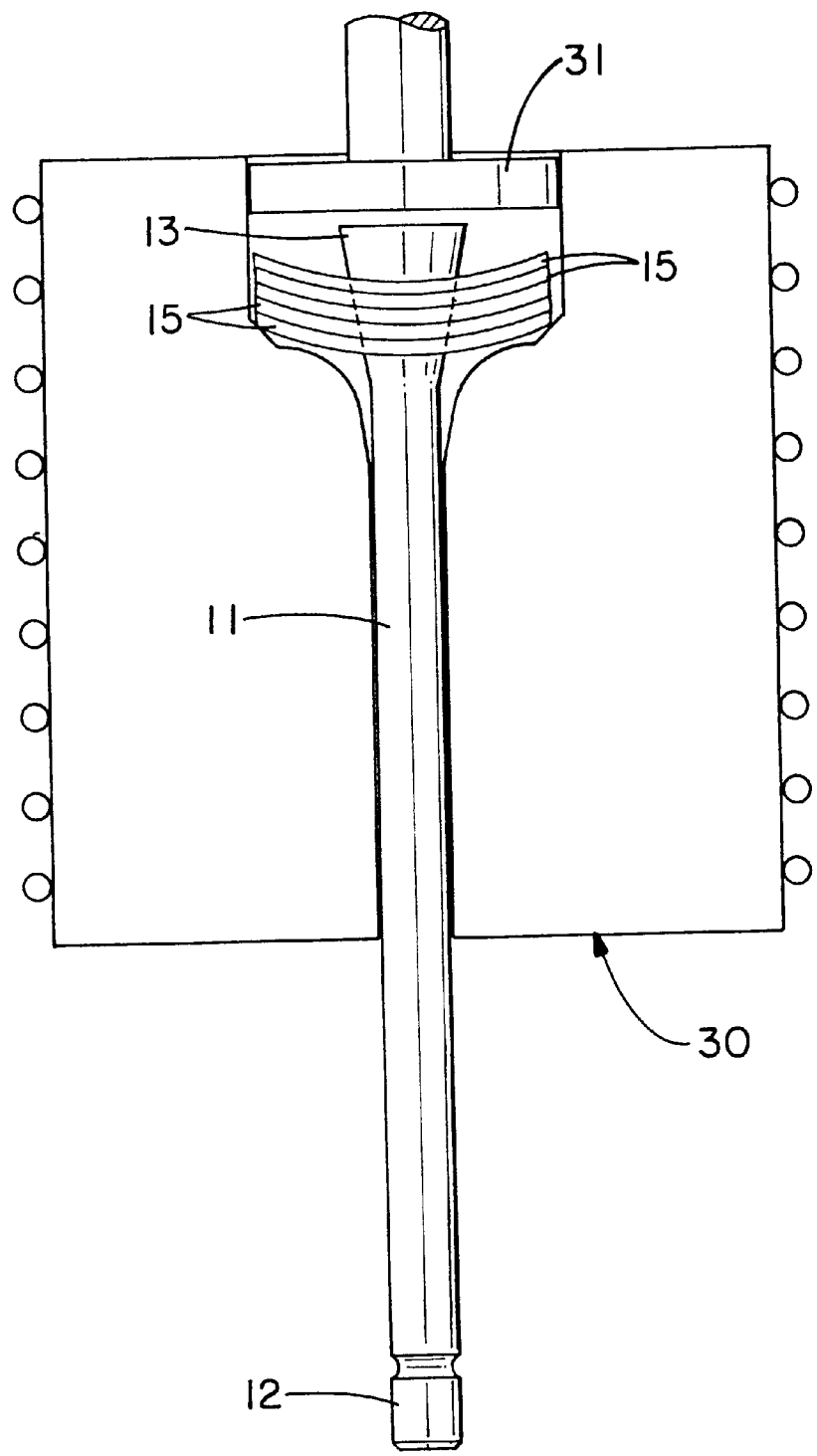
FIG. 10 is a schematic representation of the process of cure pressing the valve head plies onto the carbon-carbon (C/C) valve stem of the present invention.

As shown in FIG. 9, a plurality of substantially circular fabric plies 15 are coaxially slipped onto the non-flared end 12 of the stem and are advanced to the flared end 13 of the carbon-carbon (C/C) valve stem 11, such that said substantially circular plies 15 are in intimate reinforcing contact with the flared end 13 of the elongated cylindrical carbon-carbon (C/C) composite valve stem 11. These plies 15 are punched out of a balanced C/C prepreg and have a slit 16 in the center to slip over the non-flared end 12 of the valve stem 11. The prepreg may also contain carbon powders. This sliding action also orients the slit edges parallel to the fibers in the stem, so that a smooth transition from the vertical axis of the stem in to the horizontal plane of the valve takes place. The substantially circular plies 15 are then rotated in-plane so that orthotropic properties are assured in the stack. The carbon-carbon (C/C) composite valve stem 11, with the plurality of loosely stacked prepreg substantially circular fabric plies 15 sufficient to produce the desired valve head thickness, is positioned in a heated, one half of a matched split die 30 as shown in FIG. 10. The split die 30 is closed and a punch die 31 descends on the plurality of substantially circular plies 15 such that the plurality of substantially circular plies 15 are press cured onto to the flared end 13 of the carbon-carbon (C/C) composite valve stem 11. The press uses a punch die 31 to apply pressure onto the plurality of substantially circular plies 15, and the movement of said plies is restricted in the pressing direction, as the cavity in the split die can accommodate the valve stem only. At the end of the cure, the carbon-carbon (C/C) composite valve 10, comprising a valve head 14 cured on the valve stem 11, is removed from the heated die 30 and carbonized in a temperature range from about 700° C. to about 1000° C., and subsequently densified in a CVD cycle using hydrocarbon gases such as natural gas, or methane, propane, acetylene and the like are pyrolized in the temperature range from about 900° C. to about 1200° C. in an hydrogen atmosphere under reduced atmospheres ranging from a few torr, up to about 100 torr.

The carbon-carbon (C/C) composite valve of the present invention, unlike the prior art, preferably avoids the use of ceramic powders or boron compounds in the matrix during the prepregging stage. The primary reason for adding these powders as mentioned in the prior inventions is to impart to the valve a measure of oxidation resistance. We have conducted extensive research on oxidation protection, and have determined that in this application ceramic powders at best prevent matrix oxidation in localized regions, but can not inhibit the entire matrix. Secondly, large additions of these powders lead to agglomerations and heterogeneities in the material. Boron additions are avoided entirely because at high temperatures boron oxides form that are highly hygroscopic, which upon drying leave a powdery residue on the surface. In the long run, there is caused a gradual disintegration of the matrix.

The industry claims oxidation protection with the use of silicon carbide and/or silicon nitride coatings. It is a well known phenomenon in the carbon-carbon (C/C) industry that these coatings invariably crack during temperature cycling, which leads to ingress of oxygen and oxidation of the valve. Lastly, ceramic coatings, such as silicon carbide and/or silicon nitride coatings, are very abrasive to the valve guide and O-ring seals that guide the pneumatic spring on engine valves, such as Formula 1 engine valves.

The valve stem 11 and a valve head 14 of the carbon-carbon (C/C) composite valve 10 of the present invention preferably has a high temperature resistant two phase coating 15 thereon. The two phase coating consists of a porous inner layer on which a dense coating of a hard material is deposited. Suitable materials for the inner pliable coating are selected from the group consisting of nickel, molybdenum, aluminum, aluminum-zinc alloy, nickel aluminide, iron aluminide and the like. The outer hard coating is usually tungsten carbide, optionally with a cobalt addition; nickel-titanium alloy, optionally with an addition of at least one of chromium, cobalt and yttria; tantalum carbide; chromium carbide; and the like. The high temperature resistant coating is resistant to temperatures from about 900° C. to about 1500° C., and is adapted to withstand temperature cycling up to about 1000° C. The high temperature resistant coating provides oxidation resistance and reduces the surface porosity of the valve. The resulting carbon-carbon (C/C) composite valve also has a polished surface adapted to counteract the abrasive properties of carbon-carbon (C/C), resulting in a low surface friction.

A variety of techniques may be used to deposit the coating onto the carbon-carbon (C/C) composite valve of the present invention. Suitable techniques used to deposit this phase include plasma spraying, plasma CVD, physical vapor deposition (PVD), low pressure plasma processing, high velocity oxygen flame processing and sputtering. The coatings may have a measured porosity of about 2% to about 10% but these voids are disconnected, and are mostly in the underlying compliant layer. The top layer of the two phase coating can be machined to attain surface finishes better than 0.4 Ra micrometers.

In another embodiment of the present invention, both the stem and valve head are machined out of carbon-carbon (C/C) plates. A tapered bore is machined into the valve head. The valve stem is then tapped into place after coating its tapered section or immersed length with resin and the assembly is cured in the temperature range of about 200° C. to about 320° C. and in stages, depending on the type of resin such as thermosetting phenolics or thermoplastic epoxies, including, but not limited to bismaleimide. The assembled valve is then carbonized and CVD densified, and is coated as described hereinabove.

In another embodiment of the present invention, the carbon-carbon (C/C) composite valve of the present invention is fabricated by a known brazing technique using standard brazing powders or high temperature brazing powders based on titanium, molybdenum, copper and the like. A carbon-carbon (C/C) composite valve stem having a flared end and a non-flared end opposite said flared end is machined from a cured and densified carbon-carbon (C/C) plate having a sufficient thickness. The carbon-carbon (C/C) valve head is similarly machined from a previously cured, carbonized and densified carbon-carbon (C/C) plate of sufficient thickness to match the dimensions of the valve head. A tapered hole is machined in the center of the carbon-carbon (C/C) composite valve head having a diameter sufficient to allow the valve head to be coaxially slipped onto the non-flared end of the carbon-carbon (C/C) valve stem. The diameter of the machined hole is preferably about 2mm. The carbon-carbon (C/C) valve head is advanced to intimately contact the flared end of said carbon-carbon (C/C) valve stem. The carbon-carbon (C/C) valve stem and carbon-carbon (C/C) valve head are locked together using a tapered joint, leaving a sufficient gap for the braze material at the interface of the carbon-carbon (C/C) valve stem and carbon-carbon (C/C) valve head. The braze material is applied to the interface of said carbon-carbon (C/C) valve stem and said carbon-carbon (C/C) valve head. The braze material is preferably in form of a shim-stock, paint solution, pad, foil or paste. The valve stem and valve head are heat-treated at high temperatures up to about 100° C. in a vacuum, to bond the valve head and valve stem by the formation of a diffusion bond between the carbon-carbon (C/C) composite material and the braze material. The assembled valve is then coated with a high temperature resistant coating as described hereinabove.

In another embodiment of the present invention, a tapered valve stem is continuously drawn using a pultrusion technique. Either uni-fabric, or stretch broken fiber bundles can be used. A quick setting phenolic or epoxy resin, such as bismaleimide and other such thermosets, may be used in the pultrusion line. The emerging lengths of valve stems can be used to mold the valve head on as described in earlier techniques. The valve head can also be pressed molded in line by a moving die. In this instance, a radially slotted stack of prearranged orthotropic valve head fabric plies are slipped on to the valve stem and then cured in the heated traveling die. The assembled valve is then carbonized and CVD densified, and coated as described hereinabove.

The resulting carbon-carbon (C/C) composite valve of the present invention is useful for engine inlet and exhaust valves, such as for Formula 1 racing engines, and operate reliably up to about 20,000 RPM, at temperatures varying from 410° C. at the inlet to 900° C. at the exhaust end. The carbon-carbon (C/C) composite valve stem and head are coated with a specially graded coating that seals surface porosity up to burst pressures of 3 to 4 atmospheres, can be cycled to 1000° C. without cracking, leaking or spalling, and produce a machined surface of 0.4 Ra or better. The carbon-carbon (C/C) composite valve of the present invention has an impact toughness at the valve seat of 65 Ksi, in a biaxial state of stress. The carbon-carbon (C/C) composite valve of the present invention further has a valve stem joint strength of at least 40 Ksi.

The present invention is unique in its construction in that all other carbon-carbon (C/C) valves disclosed heretofore either ignore porosity of the carbon-carbon (C/C) composite, indicating that pores will act as receptacles for lubricants, or mention coatings such as the carbides and nitrides of silicon, which are deleterious to valve operation due to oxidation and particulation. Our studies demonstrate that surface porosity aiding surface lubricants, effect weight changes in reciprocating masses that lead to imbalances in valve trains and alter the volumetric efficiency of the engine cylinder.

In contrast to valve constructions disclosed in the prior art, a simple pull test that tests the weakest cross section of the valve at the stem-to-head transition, has shown that valves constructed according to the present invention have strengths equal to or greater than the in-plane strength of the valve stem (40–45 Ksi). The valve structures of the prior art either fail in shear strength in between the outer braid and inner core of uni-fibers, or in biaxial stress at the valve head.

Based upon the foregoing disclosure, it should now be evident that the carbon-carbon (C/C) composite valve structure and method of preparing such valves described herein will carry out the objects of the invention set forth hereinabove. It is, therefore, to be understood that variations may fall within the scope of the claimed invention and, thus, the selection of the method of fabricating or coating the carbon-carbon (C/C) valve stem or head can be determined without departing from the spirit of the invention herein disclosed and described. Thus, the scope of the invention shall include all modifications and variations that may fall within the scope of the attached claims.

We claim:

1. A method for fabricating a carbon-carbon (C/C) composite valve for high temperature internal combustion engines comprising:

machining a carbon-carbon (C/C) composite valve stem having a flared end and a non-flared end opposite said flared end from a cured and densified carbon-carbon (C/C) plate having a sufficient thickness;

machining a carbon-carbon (C/C) composite valve head from a cured and densified carbon-carbon (C/C) plate having a sufficient thickness;

machining a hole in the center of said carbon-carbon (C/C) composite valve head;

applying said carbon-carbon (C/C) valve stem coaxially onto the non-flared end of said carbon-carbon (C/C) valve stem and advancing said carbon-carbon (C/C) valve stem to intimately contact the flared end of said carbon-carbon (C/C) valve stem;

applying braze material to the interface of said carbon-carbon (C/C) valve stem and said carbon-carbon (C/C) valve head;

heating said carbon-carbon (C/C) valve stem and said carbon-carbon (C/C) valve head, with said braze material applied at the interface, at a temperature from about 800° C. to about 1100° C. in a vacuum to bond said carbon-carbon (C/C) valve stem and said carbon-carbon (C/C) valve head together; and coating at least one of said carbon-carbon (C/C) composite valve stem and valve head with a high temperature resistant coating comprising an inner layer and an outer layer.

2. The method according to claim 1, wherein said elongated cylindrical carbon-carbon (C/C) composite valve stem is machined from a densified carbon-carbon (C/C) plate of sufficient thickness.

3. The method according to claim 1, wherein said non-flared end of said carbon-carbon (C/C) composite valve stem has a substantially uniform diameter.

4. The carbon-carbon (C/C) composite valve according claim 2, wherein said carbon-carbon (C/C) plate comprises a plurality of plies of balanced woven fabrics.

5. The carbon-carbon (C/C) composite valve according claim 2, wherein said carbon-carbon (C/C) plate comprises a plurality of plies of uni-fabric that is unbalanced in fiber volume with a higher fiber volume in the stem axis direction.

6. The method according to claim 1, wherein the valve head is coated with said high temperature resistant coating.

7. The method according to claim 1, wherein both the carbon-carbon (C/C) composite valve stem and valve head are coated with said high temperatures resistant coating comprising an inner layer and an outer layer.

8. The method according to claim 1, wherein the high temperature resistant material comprising the inner layer of said coating is selected from the group consisting of nickel, molybdenum, aluminum, aluminum-zinc alloy, nickel aluminide, and iron aluminide.

9. The method according to claim 1, wherein the high temperature resistant material comprising the outer layer of the coating is selected from the group consisting of tungsten carbide, tungsten carbide with cobalt, nickel-titanium alloy, nickel-titanium alloy with chromium, nickel-titanium alloy with cobalt, nickel-titanium alloy with yttria, nickel-titanium alloy with chromium and cobalt, nickel-titanium alloy with chromium and yttria, nickel-titanium alloy with cobalt and yttria, nickel-titanium alloy with chromium, cobalt, and yttria, tantalum carbide, and chromium carbide.

10. The method according to claim 1, wherein said high temperature resistant coating is resistant to a temperature from about 900° C. to about 1500° C.

11. A carbon-carbon composite valve for high performance internal combustion produced by the method of claim 1.

* * * * *